US008160878B2

(12) United States Patent
Yu et al.

(10) Patent No.: US 8,160,878 B2
(45) Date of Patent: Apr. 17, 2012

(54) PIECEWISE-BASED VARIABLE-PARAMETER HIDDEN MARKOV MODELS AND THE TRAINING THEREOF

(75) Inventors: Dong Yu, Kirkland, WA (US); Li Deng, Redmond, WA (US); Yifan Gong, Sammamish, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 12/211,114

(22) Filed: Sep. 16, 2008

(65) Prior Publication Data

US 2010/0070279 A1    Mar. 18, 2010

(51) Int. Cl.
*G10L 15/14* (2006.01)
*G10L 15/20* (2006.01)

(52) U.S. Cl. .................. 704/256.1; 704/233; 704/256.2
(58) Field of Classification Search ........................ None
See application file for complete search history.

(56) References Cited

U.S. PATENT DOCUMENTS

| | | | |
|---|---|---|---|
| 5,806,030 A | 9/1998 | Junqua | |
| 6,006,186 A | 12/1999 | Chen et al. | |
| 6,141,641 A | 10/2000 | Hwang et al. | |
| 6,526,379 B1 | 2/2003 | Rigazio et al. | |
| 6,594,392 B2 * | 7/2003 | Santoni | 382/209 |
| 6,725,195 B2 | 4/2004 | Sankar et al. | |
| 6,829,578 B1 | 12/2004 | Huang et al. | |
| 6,865,531 B1 * | 3/2005 | Huang | 704/226 |
| 6,950,796 B2 * | 9/2005 | Ma et al. | 704/244 |
| 7,289,955 B2 | 10/2007 | Deng et al. | |
| 7,346,510 B2 * | 3/2008 | Deng | 704/254 |
| 2004/0181409 A1 | 9/2004 | Gong et al. | |
| 2004/0249628 A1 | 12/2004 | Chelba et al. | |
| 2007/0033044 A1 | 2/2007 | Yao | |

(Continued)

FOREIGN PATENT DOCUMENTS

WO    WO2006114102 A1    11/2006

OTHER PUBLICATIONS

Sankar, et al., "A Maximum-Likelihood Approach to Stochastic Matching for Robust Speech Recognition," IEEE Transactions on Speech and Audio Processing, vol. 4, No. 3, May 1996, pp. 190-202.

(Continued)

*Primary Examiner* — Brian Albertalli
(74) *Attorney, Agent, or Firm* — Zete Law, P.L.L.C.; MacLane C. Key

(57) ABSTRACT

A speech recognition system uses Gaussian mixture variable-parameter hidden Markov models (VPHMMs) to recognize speech under many different conditions. Each Gaussian mixture component of the VPHMMs is characterized by a mean parameter $\mu$ and a variance parameter $\Sigma$. Each of these Gaussian parameters varies as a function of at least one environmental conditioning parameter, such as, but not limited to, instantaneous signal-to-noise-ratio (SNR). The way in which a Gaussian parameter varies with the environmental conditioning parameter(s) can be approximated as a piecewise function, such as a cubic spline function. Further, the recognition system formulates the mean parameter $\mu$ and the variance parameter $\Sigma$ of each Gaussian mixture component in an efficient form that accommodates the use of discriminative training and parameter sharing. Parameter sharing is carried out so that the otherwise very large number of parameters in the VPHMMs can be effectively reduced with practically feasible amounts of training data.

20 Claims, 8 Drawing Sheets

U.S. PATENT DOCUMENTS

| | | |
|---|---|---|
| 2007/0083373 A1 | 4/2007 | Liu et al. |
| 2007/0271096 A1 | 11/2007 | Messina et al. |
| 2008/0010057 A1 | 1/2008 | Chengalvarayan et al. |
| 2008/0052075 A1 | 2/2008 | He et al. |
| 2008/0091424 A1 | 4/2008 | He et al. |

OTHER PUBLICATIONS

Yifan Gong, "Speech Recognition in Noisy Environments: A Survey," presentation at Tapani Raiko, Feb. 20, 2004, accessible at <<http://www.cis.hut.fi/Opinnot/T-61.182/2003/Kalvot2003/raiko1.pdf>>, 19 pages.

Lee, et al., "A Study on Speaker Adaptation of the Parameters of Continuous Density Hidden Markov Models," IEEE Transactions on Signal Processing, vol. 39, Issue 4, Apr. 1991, pp. 806-814.

Neumeyer, et al., "A Comparative Study of Speaker Adaptation Techniques," accessible at <<http://www.speech.sri.com/people/leo/papers/eurospeech95.pdf>>, 4 pages.

John, et al., "Model-Based Techniques for Noise Robust Speech Recognition," dissertation submitted to University of Cambridge, accessible at <<http://mi.eng.cam.ac.uk/~-mjfg/thesis.pdf>>, 1995, 132 pages.

Gales, et al., "A Fast and Flexible Implementation of Parallel Model Combination," Proceedings of the IEEE International Conference on Acoustics, Speech, and Signal Processing, vol. 1, 1995, pp. 133-136.

Saon, et al., "Robust Digit Recognition in Noisy Environments: The IBM Aurora 2 System," Eurospeech 2001, accessible at <<http://iesk.et.uni-magdeburg.de/ko/konferenzen/eurospeech/PAGE629.PDF>>, 4 pages.

Afify, et al., "Evaluating the Aurora Connected Digit Recognition Task: A Bell Labs Approach," Eurospeech 2001, accessible at <<http://iesk.et.uni-magdeburg.de/ko/konferenzen/eurospeech/PAGE633.PDF>>, 4 pages.

Zhu, et al., "Noise Robust Feature Extraction for ASR Using the Aurora 2 Database," accessible at <<http://nesl.ee.ucla.edu/projects/smartkg/docs/qifeng-01.pdf>>, 5 pages.

Vaseghi, et al., "Noisy Speech Recognition Using Cepstral-Time Features and Spectral-Time Filters," Proceedings of the IEEE International Conference on Acoustics, Speech, and Signal Processing, vol. 2, 1994, pp. 65-68.

Richard, et al., "Multi-Style Training for Robust Isolated-Word Speech Recognition," Proceedings of the IEEE International Conference on Acoustics, Speech, and Signal Processing, vol. 12, 1987, pp. 705-708.

Cui, et al., "Variable Parameter Gaussian Mixture Hidden Markov Modeling for Speech Recognition," Proceedings of the IEEE International Conference on Acoustics, Speech, and Signal Processing, vol. 1, 2003, pp. 12-15.

Yifan Gong "Noise-Dependent Gaussian Mixture Classifiers for Robust Rejection Decision," IEEE Transactions on Speech and Audio Processing, vol. 10, No. 2, Feb. 2002, pp. 57-64.

Dempster, et al., "Maximum Likelihood from Incomplete Data via the EM Algorithm," Journal of the Royal Statistical Society, vol. 39, No. 1. 1977, pp. 1-38.

Rainer Martin, "An Efficient Algorithm to Estimate Instantaneous SNR of Speech Signals," Proc. Eurospeech, 1993, pp. 1093-1096.

Cohen, et al., "Noise Estimation by Minima Controlled Recursive Averaging for Robust Speech Enhancement," IEEE Signal Processing Letters, vol. 9, Issue 1, 2002, pp. 12-15.

Cui, et al., "A Study of Variable-Parameter Gaussian Mixture Hidden Markov Modeling for Noisy Speech Recognition," IEEE Transactions on Audio, Speech, and Language Processing, vol. 15, Issue 4, 2007, pp. 1366-1376.

He, et al., "A Novel Learning Method for Hidden Markov Models in Speech and Audio Processing," IEEE 8th Workshop on Multimedia Signal Processing, 2006, pp. 80-85.

Lolive, et al., "Pitch and Duration Transformation with Non-Parallel Data," Proceedings of the Speech Prosody 2008 Conference, accessible at >>http://aune.lpl.univ-aix.fr/~sprosig/sp2008/papers/id103.pdf>>, 4 pages.

Bach, et al., "Discriminative Training of Hidden Markov Models for Multiple Pitch Tracking," Proceedings of the IEEE International Conference on Acoustics, Speech, and Signal Processing, vol. 5, 2005, accessible at <<http://www.di.ens.fr~fbach/icassp_pitch.pdf>>, 4 pages.

Kim, et al., "Smoothing Spline Gaussian Regression: More Scalable Computation Via Efficient Approximation," Journal of Royal Statistal Society B, vol. 66, Part 2, 2004, pp. 337-356.

Sha, et al., "Large Margin Hidden Markov Models for Automatic Speech Recognition," accessible at <<http://www.cs.berkeley.edu/~feisha/pubs/nips2006.pdf>>, 8 pages.

Dong, et al., "Use of Incrementally Regulated Discriminative Margins in MCE Training for Speech Recognition," Interspeech 2006, accessible at <<http://research.microsoft.com/srg/papers/2006-dongyu-interspeechb.pdf>>, pp. 2418-2421.

Messina, et al., "Sequential Clustering Algorithm for Gaussian Mixture Initialization," Proceedings of the IEEE International Conference on Acoustics, Speech, and Signal Processing, vol. 1, 2004, pp. 833-836.

Kannan, et al., "Maximum Likelihood Clustering of Gaussians for Speech Recognition," IEEE Transactions on Speech and Audio Processing, vol. 2, Issue 3, Jul. 1994, pp. 453-455.

Rathinavelu, et al., "HMM-Based Speech Recognition Using State-Dependent, Discriminatively Derived Transforms on Mel-Warped DFT Features," Proceedings of the IEEE International Conference on Acoustics, Speech, and Signal Processing, vol. 5, No. 3, May 1997, pp. 243-255.

Neti, et al., "Audio-Visual Speech Recognition," Workshop Final Report, Oct. 12, 2000, accessible at <<http://www.cs.cmu.edu/~iainm/papers/ws00aysr.pdf>>, 86 pages.

Yifan Gong, "Noise-Robust Open-Set Speaker Recognition Using Noise-Dependent Gaussian Mixture Classifier," Proceedings of the IEEE International Conference on Acoustics, Speech, and Signal Processing, 2002, pp. 133-136.

Juang, et al., Hidden Markov Models for Speech Recognition, Technometrics, vol. 33, No. 3. Aug. 1991, pp. 251-272.

Lawrence R. Ribiner, "A Tutorial on Hidden Markov Models and Selected Applications in Speech Recognition," Proceedings of the IEEE, vol. 77, No. 2, Feb. 1989, pp. 257-286.

"Spline (mathematics)," Wikipedia entry, accessible at <<http://en.wikipedia.org/wiki/Spline>>, accessed on Sep. 11, 2008, 6 pages.

"Cepstrum," Wikipedia entry, accessible at <<http://en.wikipedia.org/wiki/Cepstrum>>, accessed on Sep. 11, 2008, 2 pages.

\* cited by examiner

PIECEWISE-BASED VARIABLE-PARAMETER HIDDEN MARKOV MODELS AND THE TRAINING THEREOF

BACKGROUND

Speech recognition systems commonly use Hidden Markov Models (HMMs) to automatically recognize speech (e.g., by decoding the linguistic content of the speech). In a training phase, this type of speech recognition system estimates the parameters which define the HMMs; it performs this task by training the HMMs based on a set of speech signals labeled with linguistic content items (e.g., words or other forms). In a recognition phase, the speech recognition system uses the trained HMMs to recognize new speech signals.

One type of HMM is referred to as a Gaussian mixture HMM. This type of HMM uses a combination of Gaussian components (referred to as "mixture components" herein) to model the distribution of speech and noise within the environment for each state. Different environments are characterized by noise having different characteristics. Thus, to provide more robust speech recognition, Gaussian mixture HMMs can be trained using a training set that accounts for speech within different types of environments.

In the classic case, the Gaussian mixture components used by Gaussian mixture HMMs are fixed, meaning that these components do not vary as a function of the characteristics of the environment. In a more recently proposed case, the Gaussian mixture components can vary as a function of a measurable characteristic of the environment, such as the signal-to-noise ratio (SNR). For example, each Gaussian mixture component can include a mean component $\mu$ and variance component $\Sigma$, each of which varies as a function of SNR. This variable type of HMM model is referred to herein as a variable-parameter hidden Markov model (VPHMM). VPHMMs potentially offer better performance than fixed-component HMMs because the VPHMMs adapt to different types of environments, as opposed to using a single set of parameters to account for every circumstance that may be encountered within an environment.

While VPHMMs have been shown to be effective, there remains room for further improvement in this technology. Particularly, one known version of VPHMM technology uses global polynomial functions to approximate the way in which Gaussian parameters ($\mu$'s and $\Sigma$'s) vary as a function of utterance SNR. There may be various inefficiencies and limitations associated with this approach.

SUMMARY

An illustrative speech recognition system ("recognition system") is described that recognizes speech (e.g., by decoding the linguistic content of speech) using variable-parameter hidden Markov models (VPHMMs). Each of the VPHMMs uses a plurality of mixture components in modeling each state observation. Each mixture component has mixture component parameters that each vary as a function of at least one environmental conditioning parameter (referred to in the singular below for brevity). The way in which each mixture component parameter varies as a function of the environmental conditioning parameter can be approximated by using a piecewise function that includes a plurality of connected segments.

According to another illustrative aspect, the environmental conditioning parameter is based on a characteristic in the environment that affects a quality of speech recognition. For example, the characteristic can correspond to: a signal-to-noise-ratio (SNR); a power of noise in the environment; a level of noise in the environment; an accent of a speaker; a specific style of speaking by the speaker; or a rate of speech. A mixture component parameter can also vary on the basis of two or more environmental conditioning parameters.

According to another illustrative aspect, the speech recognition system recognizes speech based on an instantaneous measure of the environmental conditioning parameter. For example, speech recognition can be based on instantaneous signal-to-noise-ratio (SNR) in the cepstral domain.

According to another illustrative aspect, each mixture component uses a spline function for the piecewise function. For example, a cubic spline function can be used as the piecewise function.

According to another illustrative aspect, the mixture component parameters of each mixture component include a mean parameter $\mu$ and a variance parameter $\Sigma$. Each of the mean parameter $\mu$ and the variance parameter $\Sigma$ is represented in a form in which a Gaussian-specific part is separated from a sharable part.

According to another illustrative aspect, the recognition system can be trained using a discriminative training approach (without quantization). Discriminative training is made possible by virtue of the efficient way in which the mixture component parameters (the mean parameter $\mu$ and the variance parameter $\Sigma$) are expressed.

The ensuing Detailed Description describes other illustrative aspects of the speech recognition system. More generally, this Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2, is an illustrative procedure that provides an overview of the recognition aspects of the recognition system.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a speech recognition system ("recognition system") that uses variable-parameter hidden Markov models (VPHMMs). The recognition system incorporates various features, enumerated below, which potentially enhance the accuracy, flexibility, and/or efficiency of speech training and recognition compared to previous VPHMM solutions.

This disclosure is organized as follows. Section A provides background information regarding VPHMMs. Section B provides an overview of illustrative improvements to VPHMMs. Section C describes the application of piecewise functions to VPHMMs. Section D describes the estimation of environmental conditioning parameters for use in VPHMMs. Section E describes techniques for training VPHMMs. Section F describes the application of clustering and parameter-sharing to VPHMMs. And Section G describes illustrative processing functionality that can be used to implement any aspect of the features described in previous sections.

Figure 10:
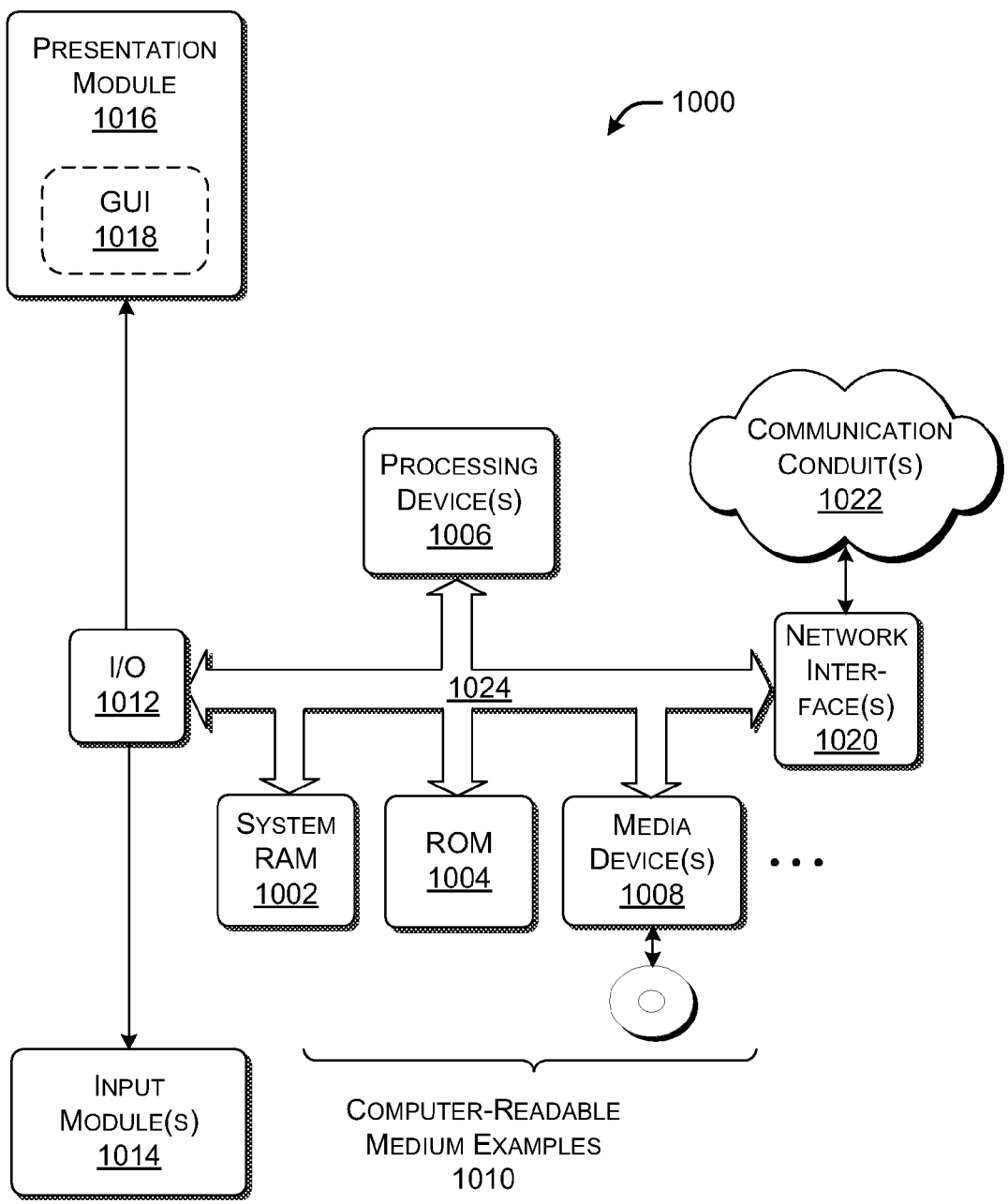
FIG. 10 shows illustrative processing functionality that can be used to implement any aspect of the features shown in the foregoing drawings.

As a preliminary matter, some of the figures describe the concepts in the context of one or more components, variously referred to as functionality, modules, features, elements, etc. The various components shown in the figures can be implemented in any manner, for example, by software, hardware, firmware, manual processing operations, and so on, or any combination of these implementations. In one case, the illustrated separation of various components in the figures into distinct units may reflect the use of corresponding distinct physical components. Alternatively, or in addition, any single component illustrated in the figures may be implemented by plural physical components. Alternatively, or in addition, the depiction of any two or more separate components in the figures may reflect different functions performed by a single physical component. FIG. 10, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including the performance of certain operations in parallel). The blocks shown in the flowcharts can be implemented by software, firmware, hardware, manual processing, any combination of these implementations, and so on.

As to terminology, the phase "configured to" encompasses any way that any kind of functionality can be constructed to perform an identified operation. The functionality can be configured to perform an operation using, for instance, hardware, software, firmware, etc., and/or any combination thereof.

The term "logic" encompasses any functionality for performing a task. For instance, each operation illustrated in the flowcharts corresponds to logic for performing that operation. In one case, logic may correspond to computer-readable instructions. In another case, logic may correspond to discrete logic components.

A. Background on Fixed-Parameter and Variable-Parameter Hidden Markov Modeling

The improvements to variable-parameter hidden Markov models (VPHMMs) presented here can best be appreciated by providing background information regarding previous VPHMM solutions. For example, Xiadong Cui and Yifan Gong introduce the concept of the VPHMM approach in "Variable Parameter Gaussian Mixture Hidden Markov Modeling for Speech Recognition," *Proceedings of the Conference on Acoustics, Speech, and Signal Processing*, Vol. 1, April 2003, pp. I-12-I-15. These authors also describe their VPHMM solution in "A Study of Variable Parameter Gaussian Mixture Hidden Markov Modeling for Noisy Speech Recognition, in *IEEE Transactions on Audio, Speech, and Language Processing*, Vol. 15, No. 5, May 2007, pp. 1366-1376, as well as published U.S. Patent Application No. US 2004/0181409. More general background information regarding hidden Markov models can be found in Lawrence R. Rabiner, "A Tutorial on Hidden Markov Models and Selected Applications in Speech Recognition," *Proceedings of the IEEE*, Vol. 77, No. 2, February 1989, pp. 257-286, as well as B. H. Juang and L. R. Rabiner, "Hidden Markov Models for Speech Recognition," *Technometrics*, August 1991, Vol. 33, No. 3, pp. 251-272.

In traditional hidden Markov models (HMMs), a continuous observation density function $b_i(x_{r,t})$ for state i and acoustic observation $x_{r,t}$ at frame t in an utterance r can be expressed as a combination of distribution components. In one particular implementation, the observation density function $b_i(x_{r,t})$ can be expressed as a combination of Gaussian distribution components. These components are referred to herein as Gaussian mixture components. In this implementation, $b_i(x_{r,t})$ is given by:

$$b_i(x_{r,t}) \sum_{l=1}^{L} w_{i,l} b_{i,l}(x_{r,t}) = \sum_{l=1}^{L} w_{i,l} N(x_{r,t} \mid \mu_{i,l}, \Sigma_{i,l}). \quad (1)$$

Here, the probability defined by $b_i(x_{r,t})$ is estimated using L Gaussian mixture components, $N(x_{r,t}|\mu_{i,l},\Sigma_{i,l})$, where l refers to the l-th Gaussian mixture component in the combination. Each mixture component is defined by fixed Gaussian parameters, namely a fixed mean component ($\mu_{i,l}$) and a fixed variance component ($\Sigma_{i,l}$). The parameter $w_{i,l}$ defines a positive weight for the l-th Gaussian component, where $\Sigma_{l=1,\ldots L} w_{i,l=1}$. Further note that $x_{r,t}$, $\mu_{i,l}$ and $\Sigma_{i,l}$ are vectors. A particular dimension of these vectors is represented by d.

HMMs that use Gaussian mixtures components are potentially effective in modeling speech within noisy environments. To facilitate recognition, these types of HMMs can be trained using speech signals (and associated noise) that simulate several different environments. However, these HMMs also have potential drawbacks. For example, as addressed by Cui and Gong, it may not be efficient to use a single set of fixed models to account for different environments in which speech may occur. First, after training, recognition takes place in a single environment at any given point in time; in this case, the great diversity of environments encompassed by the HMMs can complicate recognition (e.g., by providing a large model space that needs to be searched during recognition). This factor, in turn, may potentially degrade the quality of recognition. Further, even though the Gaussian mixture HMMs are robust, they may still be ineffective in modeling all of the environments in which speech may occur. For example, these types of HMMs may have difficulty accounting for new types of noise or known types of noise that occur at newly-encountered intensities.

The VPHMM approach addresses these potential drawbacks by replacing the fixed Gaussian components with variable components. Namely, the Gaussian components ($\mu_{i,l}, \Sigma_{i,l}$) in the VPHMM approach become functions of an environment-dependent parameter set $\zeta$:

$$b_i(x_{r,t}, \zeta) = \sum_{l=1}^{L} w_{i,l} N(x_{r,t} \mid \mu_{i,l}(\zeta), \Sigma_{i,l}(\zeta)). \quad (2)$$

That is, the mean parameter $\mu_{i,l}(\zeta)$ now varies as a function of the environmental conditioning parameter $\zeta$. Likewise, the variance parameter $\Sigma_{i,l}(\zeta)$ varies as a function of the environmental conditioning parameter $\zeta$. The environmental conditioning parameter proposed by Cui and Gong is utterance signal-to-noise-ratio (SNR).

The parameters $\mu_{i,l}(\zeta)$ and $\Sigma_{i,l}(\zeta)$ can be learned from training data during a training phase. More specifically, the Gaussian parameters $\mu_{i,l}(\zeta)$ and $\Sigma_{i,l}(\zeta)$ can be constructed using a parametric approach. For example, Cui and Gong use a global polynomial regression function over the utterance SNR to represent the mean parameter $\mu_{i,l}(\zeta)$ and the variance parameter $\Sigma_{i,l}(\zeta)$; further, their approach uses the maximum likelihood (ML) algorithm to estimate the parameters in the polynomial functions. A diagonal covariance matrix is assumed. The Gaussian parameters in the d-th dimension are determined by:

$$\mu_{i,l,d}(\zeta_{r,t,d}) = \xi(\zeta_{r,t,d} \mid \mu_{i,l,d}^{(1)}, \ldots, \mu_{i,l,d}^{(K)}), \text{ and} \quad (3)$$

$$\Sigma_{i,l,d}(\zeta_{r,t,d}) = \Sigma_{i,l,d}^{(0)} e^{\xi(\zeta_{r,t,d} \mid \Sigma_{i,l,d}^{(1)} \cdots \Sigma_{i,l,d}^{(K)})}. \quad (4)$$

Here, $\mu_{i,l,d}^{(1)}, \ldots, \mu_{i,l,d}^{(K)}$ and $$\Sigma_{i,l,d}^{(1)}, \ldots, \Sigma_{i,l,d}^{(K)}$$

are polynomial parameters for the mean parameters and variance parameters, respectively, and $$\Sigma_{i,l,d}^{(0)}$$

is the original variance parameter in a conventional HMM. Note that equation (4) is chosen to guarantee that $\Sigma_{i,l,d}(\zeta_{r,t,d}) > 0$. In the context of equations (3) and (4), $\xi$ represents the polynomial function that is defined by the polynomial parameters $\mu_{i,l,d}^{(1)}, \ldots, \mu_{i,l,d}^{(K)}$ and $$\Sigma_{i,l,d}^{(1)}, \ldots, \Sigma_{i,l,d}^{(K)},$$

respectively.

B. Overview of Illustrative VPHMM Improvements

An improved speech recognition system is described herein that uses Gaussian mixture variable-parameter hidden Markov models (VPHMMs) to recognize speech (e.g., by decoding the linguistic content of speech). According to one feature, the recognition system uses spline functions to model the way in which its Gaussian parameters change as a function of one more environmental conditioning parameter (rather than global single-piece polynomial functions). According to another feature, the recognition system 100 uses an instantaneous measure the environmental conditioning parameter (or parameters) (rather than utterance SNR). According to another feature, recognition system expresses the Gaussian components in a way in which a Gaussian-specific part is separated from a sharable part. According to another feature, the recognition system uses a discriminative training operation to generate the parameters of the VPHMMs. The discriminative training operation is more effective and efficient than other solutions (for instance, dispensing with the use of quantization of the conditioning parameters); this efficiency is made possible, in part, due to the effective way in which the Gaussian components are expressed.

The speech recognition system also facilitates sharing of spline parameters. For instance, according to one feature, the speech recognition system applies a clustering operation to identify classes of spline functions. The speech recognition system can provide a shared store that provides spline parameters associated with the identified classes. Particular instances of spline functions in the VPHMMs can make reference to the shared store to obtain corresponding spline parameters; this reduces the need for spline functions to individually provide "local copies" of their corresponding spline parameters. The clustering is made feasible, in part, by the efficient way in which the Gaussian components are expressed.

The above list of features is representative, not exhaustive. Additional details regarding the features enumerated above will be provided in the following sections.

Figure 1:
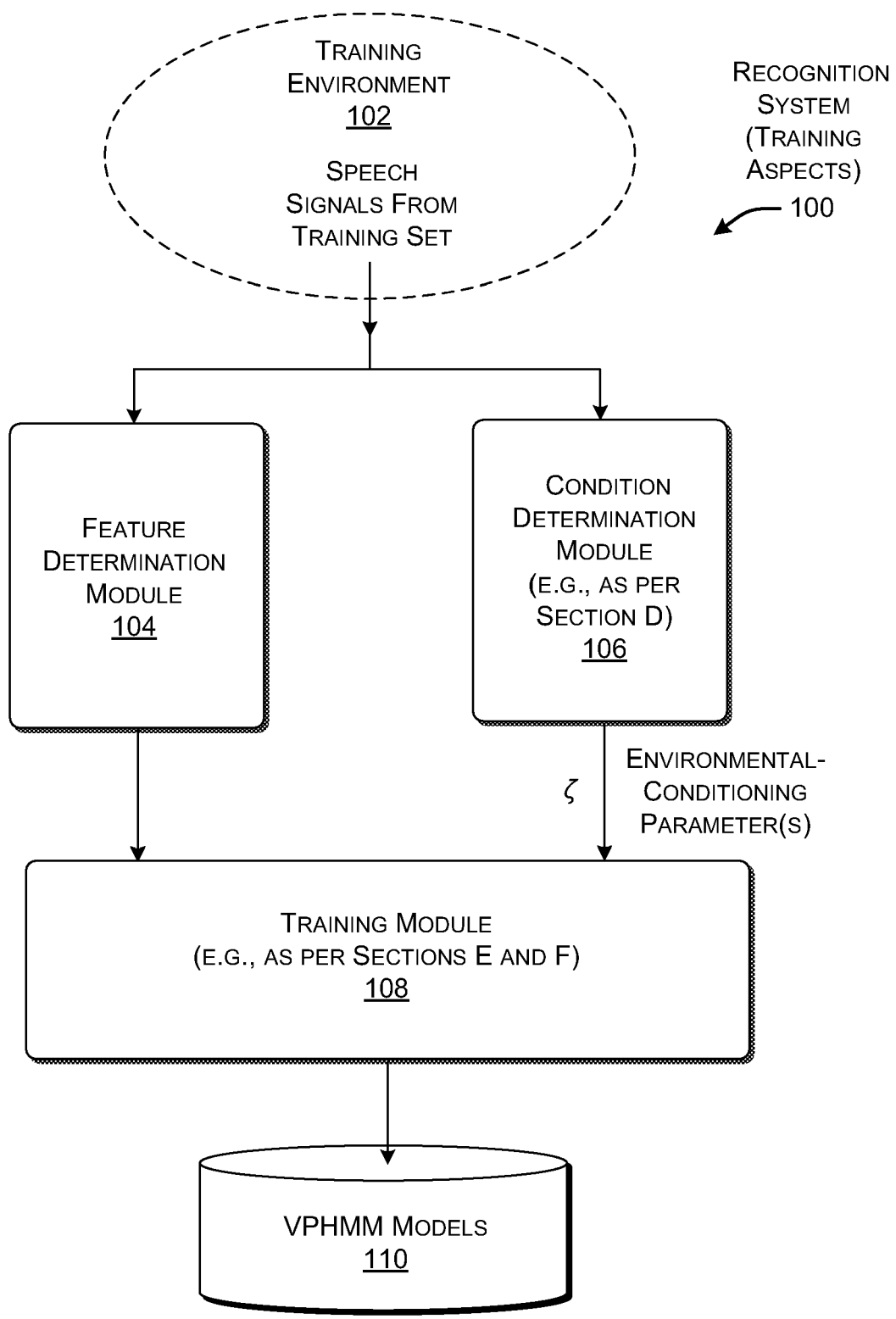
FIG. 1 shows an illustrative recognition system for recognizing speech using variable-parameter hidden Markov models (VPHMM), here showing training aspects of the recognition system.
Figure 2:
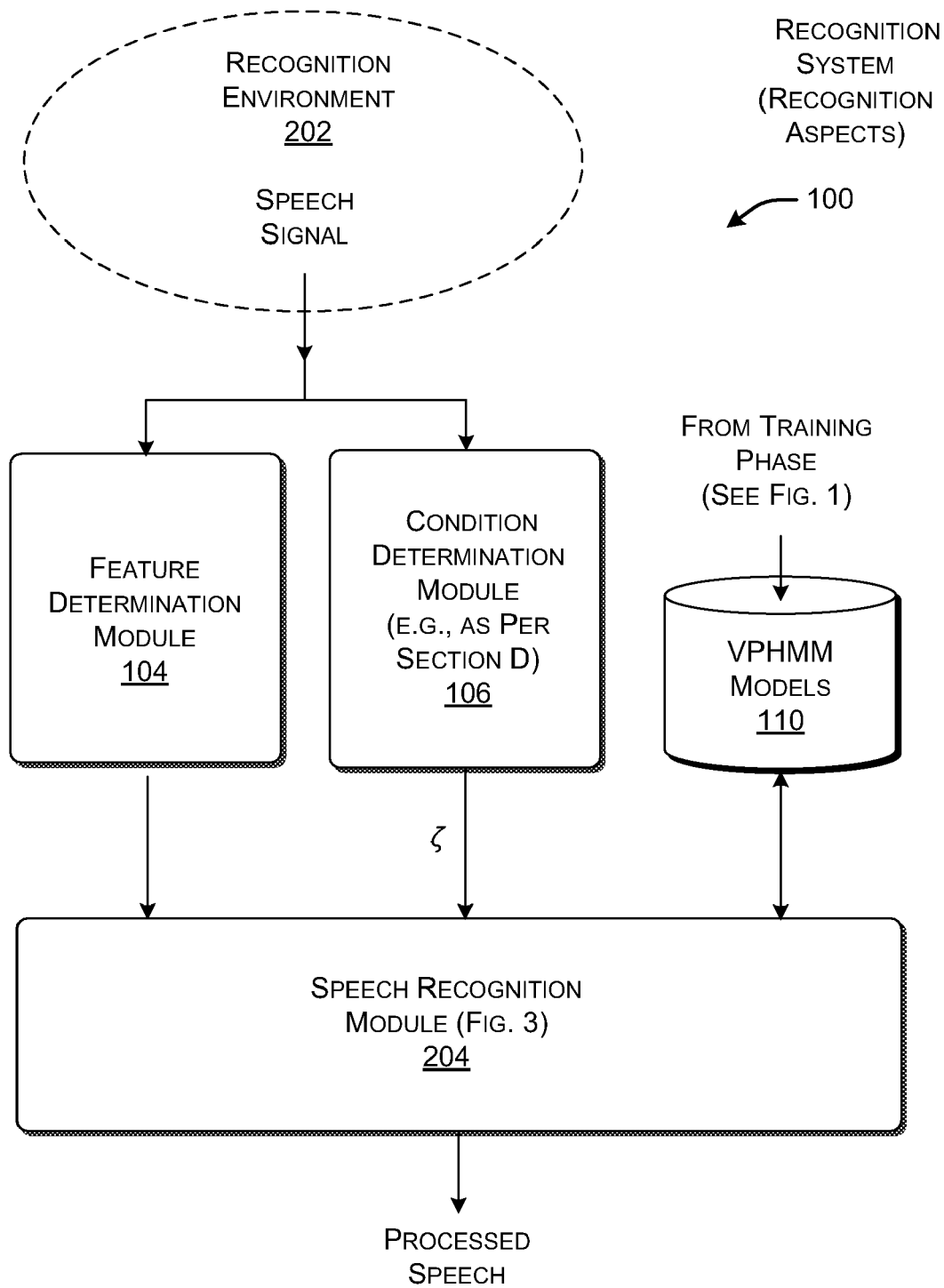
FIG. 2 shows the recognition system of FIG. 1, here showing recognition aspects of the recognition system.
Figure 3:
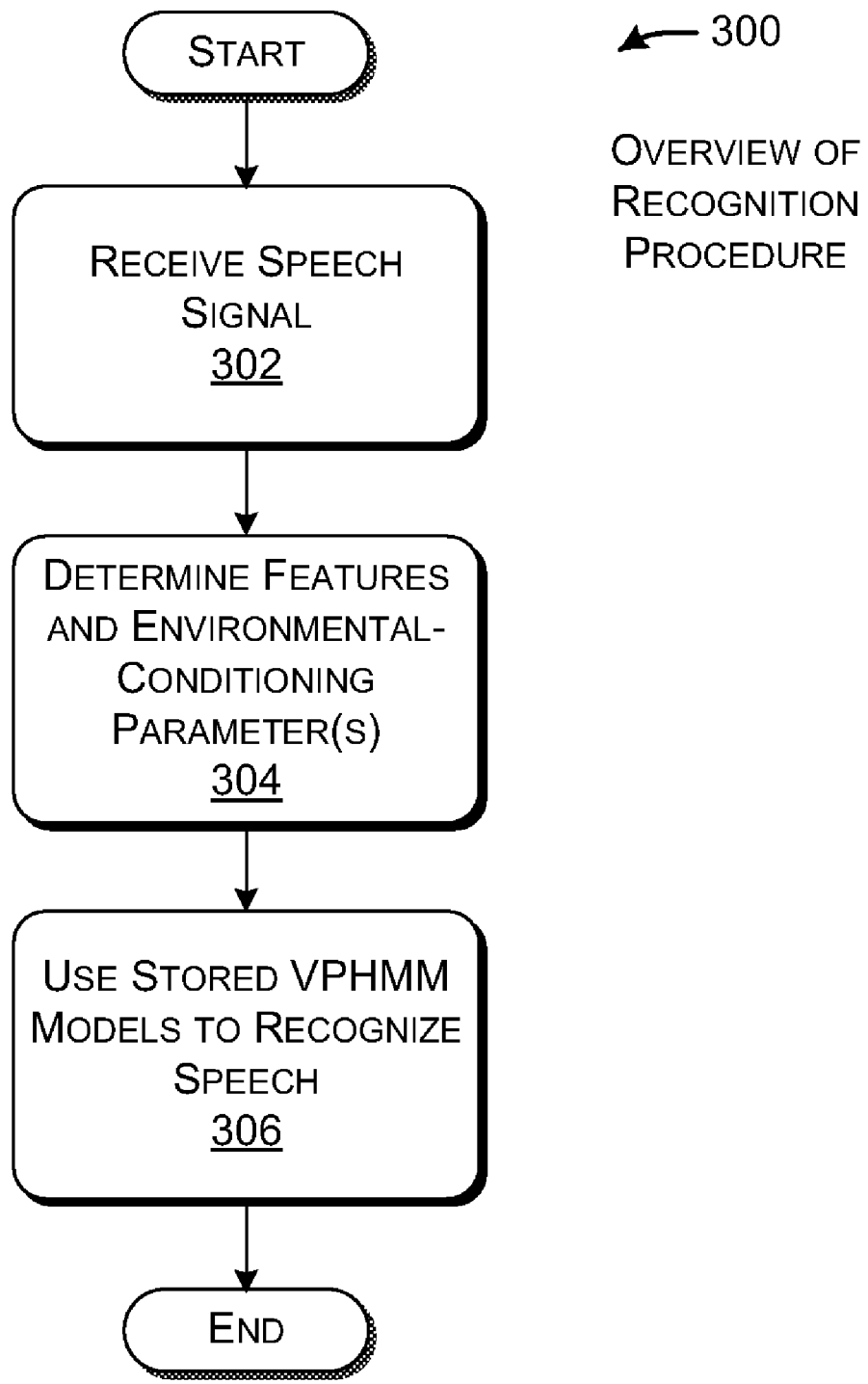
FIG. 3, which complements

Before discussing the individual features in detail, this section will provide an overview of the recognition system with reference to FIGS. 1-3. These figures show a recognition system 100 for recognizing speech. The recognition system 100 operates in a training phase and a recognition phase. The training phase involves determining the parameters of the VPHMMs; these parameters define the VPHMMs. The recognition phase entails using the VPHMMs to recognize speech. FIG. 1 shows the training aspects of the recognition system 100, while FIGS. 2 and 3 describe the recognition aspects of the recognition system 100.

As shown in FIG. 1, the recognition system 100 is trained by presenting a training set to the recognition system 100. The training set represents a set of speech signals that occur within a testing environment 102. The training set labels the speech signals to indicate phonemes and/or words that the speech signals represent. The testing environment 102 may encompass plural environments in which speech occurs. The environments may be characterized by one or more environmental conditions which affect the recognition of speech. For example, the environmental conditions may take the form of noise of different types, and/or noise of the same type at different intensities. Alternatively, or in addition, the environmental conditions may take the form of different speaking rates, and/or different speech accents (e.g., a French accent, a German accent, etc.), and/or different speech styles, and so on. No limitation is placed herein on what environmental conditions may affect the recognition of speech.

A feature determination module 104 extracts features from the training set. The features pertain to information which characterizes the speech. Any feature extraction functionality can be used to perform this task, such as Mel-frequency cepstral coefficient (MFCC) functionality.

A condition determination module 106 measures one or more of the above-mentioned environmental conditions that affect the ability of the recognition system 100 to recognize speech. The condition determination module 106 formulates these measurements in terms of one or more environmental conditioning parameters. For example, one or more environmental conditioning parameters may be generated that are based on noise within the testing environment 102. For example, one environmental conditioning parameter can measure signal-to-noise-ratio (SNR) within the testing environment 102. Another environmental conditioning parameter may reflect a level of noise within the testing environment 102. Another environmental conditioning parameter may reflect a power of noise within the testing environment 102. One or more other types of environmental conditioning parameters may reflect aspects of the speech which are attributed to the speaker himself or herself. For example, another environmental conditioning parameter may reflect a rate of speech. Another environmental conditioning parameter may reflect an accent of speech. Another environmental conditioning parameter may reflect a style of speech by a speaker, and so on. No limitation is placed herein on what may constitute an environmental conditioning parameter; broadly, an environmental conditioning parameter reflects any aspect of the testing environmental 102 that has an impact on the ability of the recognition system 100 to recognize speech.

In one case, the recognition system 100 can operate on the basis of a single environmental conditioning parameter. In other cases, the recognition system 100 can operate on the basis of plural environmental conditioning parameters. In one scenario of this latter case, the recognition system 100 can operate on the basis of plural variables which reflect the plural environmental conditioning parameters. In another scenario, the recognition system 100 can operate on the basis of a single variable, and that single variable, in turn, can be based on plural environmental conditioning parameters. To facilitate explanation, the recognition system 100 will be described below as acting on a single environmental conditioning parameter, such as signal-to-noise-ratio (SNR). However, it should be kept in mind that the recognition system 100 can operate on the basis of plural environmental conditioning parameters in the manner described above.

In one case, the condition determination module 106 can provide an instantaneous measurement of the environmental conditioning parameter to be operated on by the recognition system 100. For example, the recognition system 100 can operate based on instantaneous sign-to-noise-ration (SNR). In contrast, previous solutions describe a recognition system which operates based on utterance SNR. Utterance SNR appropriates SNR on the basis of the noise that is manifested over an entire unit of speech, such as an entire phoneme or an entire word or an entire sentence, etc. The use of utterance SNR requires quantization (to explicitly separate different speech classes), which complicates the operation of the recognition system.

Section D (below) will provide additional details regarding the condition determination module 106.

A training module 108 receives features extracted by the feature determination module 104 and at least one environmental conditioning parameter provided by the condition determination module 106. The training module 108 proceeds by generating the parameters which define the VPHMMs. In a broad sense, the training tries to find those models that best account for the observations in the labeled training set. The training module 108 stores the parameters which define the VPHMMs in a data store 110. These parameters are used in the recognition phase of the recognition system 100 (to be described below).

The training module 108 applies a discriminative training approach which differs from previous VPHMM solutions. For instance, the training module 108 represents the Gaussian parameters of the VPHMMs using piecewise functions, such as cubic spline functions. Further, the training module 108 represents the Gaussian parameters in a way in which a Gaussian-specific part is separated from a sharable part (associated with the knots of the spline functions). The way in which the Gaussian parameters are expressed allows the training module 108 to perform its training using a different approach than previous solutions. For example, the training module 108 trains the VPHMM parameters directly from a single conventional HMM instead of from a set of them trained under quantized SNR conditions. Section E provides additional details regarding the training operation.

Further, the training module 108 can optionally apply a clustering operation which identifies classes of spline functions. Parameters which describe these common classes can be stored in a shared data store. An instance of a spline function that belongs to one of these classes can make reference to the stored parameters which define the class. This avoids the need for this instance of a spline function to store an individual copy of the spline function's parameters. Section F provides additional details regarding the clustering operation.

It should be noted that the clustering operation is qualified as being optional. This means that the recognition system 100 can express each spline function using individual copies of the parameters which define the spline function, rather than making reference to a common pool of spline parameters.

Advancing to FIG. 2, this figure shows the recognition aspects of the recognition system 100. In this case, the recognition system 100 accepts a new speech signal in a recognition environment 202. It is not known a priori what information is being imparted by this new speech signal. The goal of the recognition system 100 in the recognition phase is to recognize speech based on the speech signal.

The recognition system 100 recognizes speech using a speech recognition module 204. The speech recognition module 204 operates based on input received from the feature determination module 104 and the condition determination module 106. These modules (104, 106) operate in the same manner as described above with respect to FIG. 1. That is, the feature determination module 104 extracts features from the speech signal that characterize the informational content of the speech signal. The condition determination module 106 forms at least one environmental conditioning parameter which characterizes one or more environmental conditions which impact the recognition of speech. In the following discussion, to facilitate explanation, the condition determination module 106 is described as providing a single environmental conditioning parameter. In one example, the condition determination module 106 can provide a measure of instantaneous SNR.

The speech recognition module 204 also interacts with the parameters provided in the data store 110. These parameters describe the VPHMMs that have been generated in the training phase. The VPHMMs include Gaussian parameters that are a function of the environmental conditioning parameter; thus, the VPHMMs, in effect, are customized based on the measured value of the environmental conditioning parameter.

The speech recognition module 204 recognizes speech by attempting to find the VPHMMs that best account for the features identified by the feature determination module 104.

This procedure can make use of known search algorithms for finding the most appropriate VPHMMs within a total search space defined by the VPHMMs.

FIG. 3 shows a procedure 300 which provides a general overview of the recognition aspects of the recognition system 100. In block 302, the recognition system 100 receives a speech signal. The speech signal may represent informational content associated with a human utterance, as well as one or more environmental conditions (such as noise) which may impact speech recognition. In block 304, the recognition system 100 determines features associated with the informational content of the speech signal, as well as an environmental conditioning parameter which expresses the environmental condition in the recognition environment 202. In block 306, the recognition system uses the stored VPHMMs to recognize the speech—e.g., to determine the informational content of the speech signal.

C. Approximation of Gaussian Components Using Piecewise Functions

As summarized above, the recognition system 100 can use piecewise functions (each of which is denoted by the symbol ξ) to represent the way in which Gaussian parameters (the mean parameter μ and the variance parameter Σ) vary as a function of the environmental conditioning parameter (which is denoted by the symbol ζ). More specifically, in one illustrative case, the recognition system 100 uses spline functions as the piecewise functions, such as cubic spline functions. The following discussion will be framed in the context of the use of cubic spline functions, but it should be emphasized that other implementations can use other types of piecewise functions.

Figure 4:
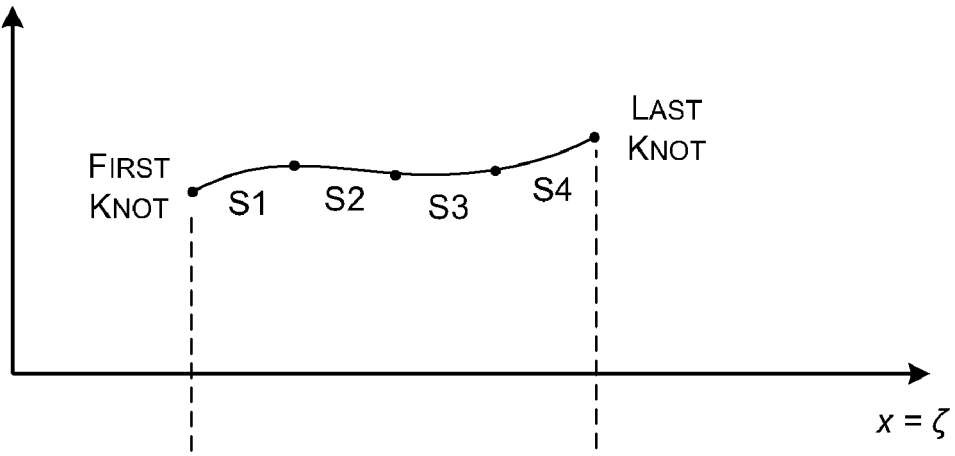
FIG. 4 shows an example of a piecewise function that can be used to approximate the manner in which a Gaussian parameter varies as a function of an environmental conditioning parameter.

FIG. 4 shows one spline function that expresses the way in which a Gaussian parameter (the mean parameter μ or the variance parameter Σ), plotted along a y dimension varies as a function of the environmental conditioning parameter (ζ), plotted along an x dimension. In this merely illustrative case, the spline function includes four spline segments (S1, S2, S3, and S4). The spline segments include respective endpoints, referred to as knots. Each spline segment represents a polynomial curve that can be parametrically defined. In general, the goal of the spline-based curve fitting is to select the parameters which define the spline function such that the spline function best approximates the change of the Gaussian parameter over the measured environmental conditioning parameter (ζ). Although not shown in FIG. 4, the Gaussian parameters and environmental conditioning parameter are vectors with multiple dimensions. Thus, spline-based curve fitting can be performed in multiple dimensions d.

More formally, in one illustrative implementation, it can be assumed that the covariance matrices are diagonal and that each dimension d of the mean and variance vector can be approximated with a cubic spline ξ as:

$$\mu_{i,l,d}(\zeta_{r,t,d}) = \mu_{i,l,d}^{(0)} + \xi(\zeta_{r,t,d} \mid \mu_{\overline{\omega}(i,l,d)}^{(1)}, \ldots, \mu_{\overline{\omega}(i,l,d)}^{(K)}), \text{ and} \quad (5)$$

$$\Sigma_{i,l,d}(\zeta_{r,t,d}) = \Sigma_{i,l,d}^{(0)} \xi^{-2}(\zeta_{r,t,d} \mid \Sigma_{\overline{\omega}(i,l,d)}^{(0)}, \ldots, \Sigma_{\overline{\omega}(i,l,d)}^{(K)}). \quad (6)$$

In these expressions, $\mu_{i,l,d}^{(0)}$ and $\Sigma_{i,l,d}^{(0)}$ are the Gaussian-component-specific mean and variance, and $\mu_{\overline{\omega}(i,l,d)}^{(1)}, \ldots, \mu_{\overline{\omega}(i,l,d)}^{(K)}$ and $\Sigma_{\overline{\omega}(i,l,d)}^{(1)}, \ldots, \Sigma_{\overline{\omega}(i,l,d)}^{(K)}$ are the spline knots that can be shared across different Gaussian components.

The notation $\overline{\omega}(i, l, d)$ refers to a regression class. That is, in one implementation, the training module 108 can identify parameters that are shared by multiple Gaussian components. A data store can store these shared parameters. Different regression classes represent different sets of shared parameters. In this approach, if a particular Gaussian component has parameters that are described by one of the regression classes, it can make reference to the appropriate regression class (by providing information, $\overline{\omega}(i, l, d)$, which identifies the regression class). In this manner, multiple Gaussian components that make reference to the same shared set of parameters are not required to store duplicate copies of these parameters. However, the use of sharing and regression classes is optional. This means that each Gaussian component can provide its own instantiations of its parameters. This further means that the equations developed herein can dispense with the $\overline{\omega}(i, l, d)$ notation. Section F provides additional information regarding the use of clustering and sharing in the VPHMM approach disclosed herein.

Note that (6) is different from (4) and can lead to a significantly simplified re-estimation formula in the training phase (as described in Section E).

Given K knots $\{(x^{(i)}, y^i) | i=1, \ldots, K; x^{(i)} < x^{(i+1)}\}$ in the cubic spline, the value of a data point x can be estimated by:

$$y = ay^{(j)} + by^{(j+1)} + c\frac{\partial^2 y}{\partial x^2}\bigg|_{x=x^{(j)}} + d\frac{\partial^2 y}{\partial x^2}\bigg|_{x=x^{(j+1)}}. \quad (7)$$

Here, a, b, c, and d are interpolation parameters, and $[x^{(j)}, x^{(j+1)}]$ refers to a section where the point x falls. The interpolation parameters (a, b, c, d) are given by:

$$a = \frac{x^{(j+1)} - x}{x^{(j+1)} - x^{(j)}}, c = \frac{1}{6}(a^3 - a)(x^{(j+1)} - x^{(j)})^2, \text{ and} \quad (8)$$

$$b = 1 - a, \text{ and } d = \frac{1}{6}(b^3 - b)(x^{(j+1)} - x^{(j)})^2. \quad (9)$$

Assume that that $x^{(j)}$ are evenly distributed, and that the following expression applies:

$$h = x^{(j+1)} - x^{(j)} = x^{(k+1)} - x^{(k)} > 0, \forall j, k \in \{1, \ldots K-1\} \quad (10)$$

Further assume that a natural spline is used. In this case, equation (7) can be written as:

$$y = (E_x^T + F_x^T C^{-1} D)\tilde{y}, \quad (11)$$

where:

$$\tilde{y} = [y^{(1)} \ldots y^{(K)}]^T, \quad (12)$$

$$E_x = \left[ 0 \cdots \underset{j}{a} \ \underset{j+1}{b} \cdots 0 \right]^T, \quad (13)$$

$$F_x = \left[ 0 \cdots \underset{j}{c} \ \underset{j+1}{d} \cdots 0 \right]^T, \quad (14)$$

-continued $$C = \frac{h}{6}\begin{bmatrix} 1 & 0 & 0 & \ldots & \ldots & \ldots & 0 \\ 1 & 4 & 1 & 0 & \ldots & \ldots & 0 \\ \vdots & \vdots & \vdots & \vdots & \vdots & \vdots & \vdots \\ \ldots & 0 & 1 & 4 & 1 & 0 & \ldots \\ \vdots & \vdots & \vdots & \vdots & \vdots & \vdots & \vdots \\ 0 & \ldots & \ldots & 0 & 1 & 4 & 1 \\ 0 & \ldots & \ldots & \ldots & 0 & 0 & 1 \end{bmatrix}, \quad (15)$$

and $$D = \frac{1}{h}\begin{bmatrix} 0 & 0 & 0 & \ldots & \ldots & \ldots & 0 \\ 1 & -2 & 1 & 0 & \ldots & \ldots & 0 \\ \vdots & \vdots & \vdots & \vdots & \vdots & \vdots & \vdots \\ \ldots & 0 & 1 & -2 & 1 & 0 & \ldots \\ \vdots & \vdots & \vdots & \vdots & \vdots & \vdots & \vdots \\ 0 & \ldots & \ldots & 0 & 1 & -2 & 1 \\ 0 & \ldots & \ldots & \ldots & 0 & 0 & 0 \end{bmatrix}. \quad (16)$$

It follows that:

$$\frac{dy}{d\tilde{y}} = (E_x^T + F_x^T C^{-1} D)^T. \quad (17)$$

Since a, b, c, d are functions of x, $E_x$ and $F_x$ are also functions of x. However, $C^{-1}D$ is independent of x. This allows $C^{-1}D$ to be pre-calculated, stored, and shared across different splines (making this solution computationally efficient). Cubic splines provide several other favorable features. First, for these functions, interpolation is smooth up to the second-order derivative. Second, an interpolation value depends only on the nearby data points (knots). Third, the interpolation accuracy can be improved by increasing the number of knots.

The following expressions are now defined:

$$\tilde{\mu}_{\bar{\omega}(i,l,d)} = [\mu_{\bar{\omega}(i,l,d)}^{(1)}, \ldots, \mu_{\bar{\omega}(i,l,d)}^{(K)}]^T, \quad (18)$$

$$v_{\bar{\omega}(i,l,d)}^T(\zeta_{r,t,d}) = E_{\zeta_{r,t,d}}^T + F_{\zeta_{r,t,d}}^T C^{-1} D, \quad (19)$$

$$\tilde{\Sigma}_{\bar{\omega}(i,l,d)} = [\Sigma_{\bar{\omega}(i,l,d)}^{(1)}, \ldots, \Sigma_{\bar{\omega}(i,l,d)}^{(K)}]^T, \text{ and} \quad (20)$$

$$\varsigma_{\bar{\omega}(i,l,d)}^T(\zeta_{r,t,d}) = E_{\zeta_{r,t,d}}^T + F_{\zeta_{r,t,d}}^T C^{-1} D. \quad (21)$$

Using the above expressions, the parametric form of equations (5) and (6) can be rewritten succinctly as:

$$\mu_{i,l,d}(\zeta_{r,t,d}) = \mu_{i,l,d}^{(0)} + v_{\bar{\omega}(i,l,d)}^T(\zeta_{r,t,d})\tilde{\mu}_{\bar{\omega}(i,l,d)}, \text{ and} \quad (22)$$

$$\Sigma_{i,l,d}(\zeta_{r,t,d}) = \Sigma_{i,l,d}^{(0)}(\varsigma_{\bar{\omega}(i,l,d)}^T(\zeta_{r,t,d})\tilde{\Sigma}_{\bar{\omega}(i,l,d)})^{-2}. \quad (23)$$

D. Estimation of Conditioning Parameters

As explained above, different types of environmental conditioning parameters can be used to model the environmental conditions present in the environment. In one illustrative case, the environment-conditioning parameter can represent instantaneous posterior SNR in the cepstral domain, which can be expressed as:

$$\zeta_d = \sum_i a_{d,i}\log\frac{\sigma_{i,y}^2}{\sigma_{i,n}^2} = \sum_i a_{d,i}(\log\sigma_{i,y}^2 - \log\sigma_{i,n}^2). \quad (24)$$

Here, $a_{d,i}$ is the inverse discrete cosine transformation (IDCT) coefficient, $\sigma_{i,y}^2$ is the power of noisy speech signal y associated with the i-th Mel-frequency filter, and $\sigma_{i,n}^2$ is the power of a noise component n of the noisy speech signal y associated with the i-th Mel-frequency filter. The noise power $\sigma_{i,n}^2$ can be estimated using a minimum-controlled recursive moving-average noise tracker. One such noise-tracker that can be used is described in Israel Cohen, "Noise Estimation by Minima Controlled Recursive Averaging for Robust Speech Enhancement," *IEEE Signal Processing Letters*, Vol. 9, No. 1, January 2002.

Figure 5:
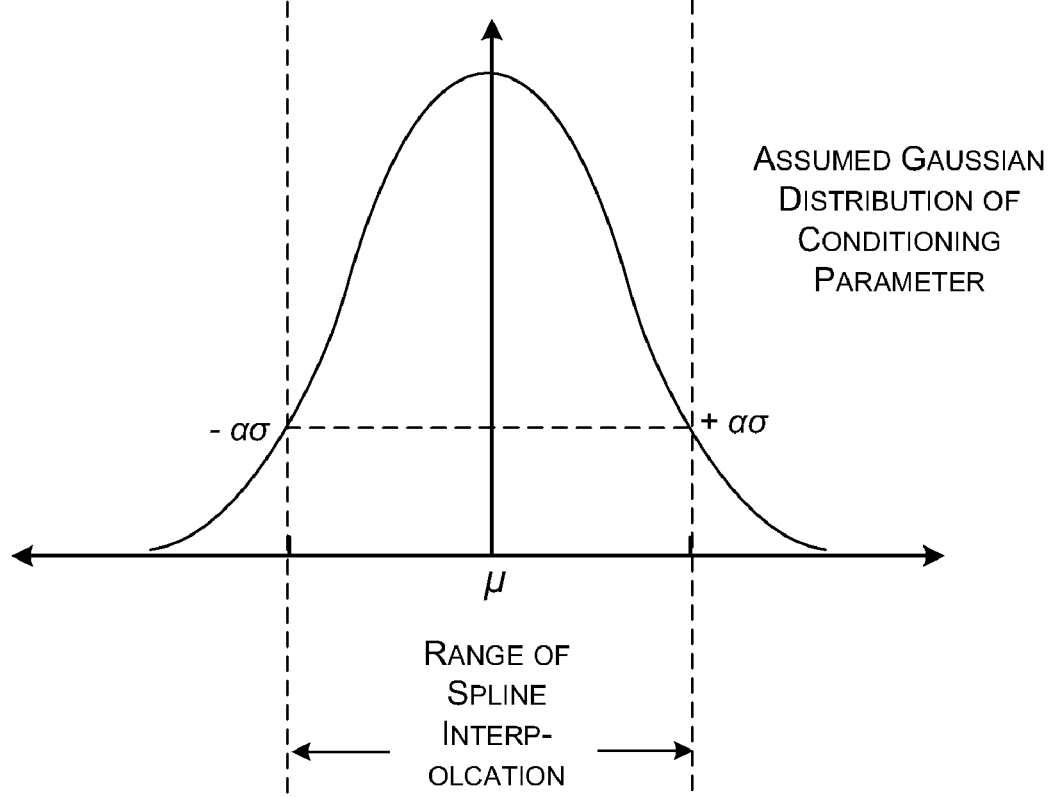
FIG. 5 shows a probability distribution that can be used to determine a range of interpolation for the piecewise function of FIG. 4.

FIG. 5 graphically illustrates how measurements of the environmental conditioning parameter (such as, but not limited to, instantaneous SNR) can be used to define a range of interpolation associated with a spline function. As indicated there, the distribution associated with the environmental conditioning parameter can be assumed to be Gaussian. The Gaussian distribution is characterized by a mean ($\mu_{\zeta_d}$) and a standard deviation ($\sigma_{\zeta_d}$), which can be estimated from the training data. The range of interpolation can be defined by identifying a portion of this Gaussian distribution. For example, the range of interpolation can be selected to extend from a $\mu_{\zeta_d} - \alpha\sigma_{\zeta_d}$ position in the distribution to a $\mu_{\zeta_d} + \alpha\sigma_{\zeta_d}$ in the distribution, where, in one merely illustrative case, $\alpha$ is 2. In other words, $\mu_{\zeta_d} - \alpha\sigma_{\zeta_d}$ defines a first knot in the spline function, while $\mu_{\zeta_d} + \alpha\sigma_{\zeta_d}$ defines a last knot in the spline function. Although not shown, it is possible to extrapolate beyond the range of measured data using the spline-based fitting approach.

E. Discriminative Training for a VPHMM-Based Recognition System

Figure 6:
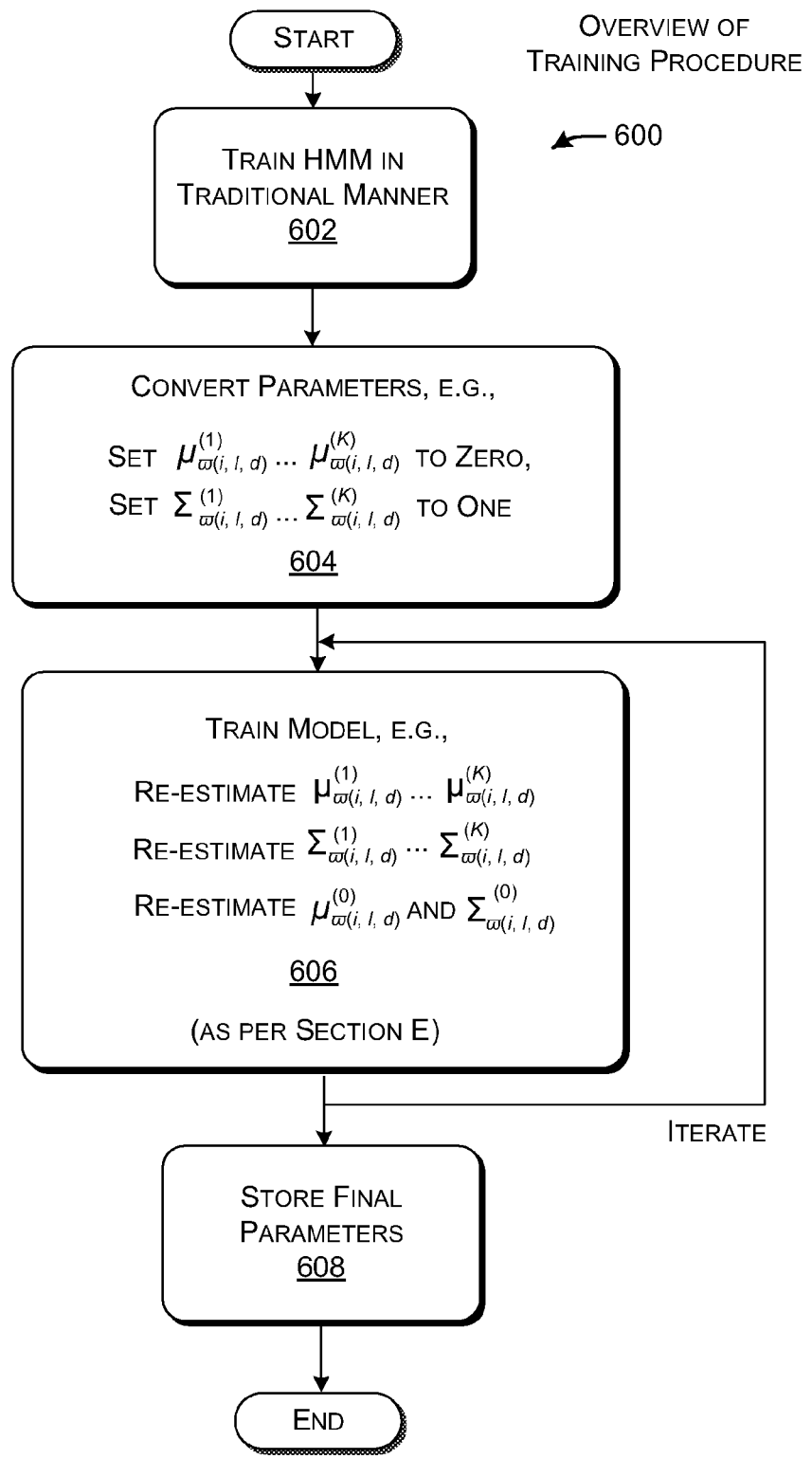
FIG. 6 is an illustrative procedure for training VPHMMs that use piecewise functions.

FIG. 6 shows a procedure 600 that sets forth operations in an illustrative training operation performed by the training module 108 of FIG. 1. To review, the general goal of the training operation is to derive parameters which define the VPHMMs. The training operation shown in FIG. 6 can be generally characterized as a growth-transformation (GT) based discriminative training algorithm. The training operation operates in an efficient and powerful way that is made possible through the manner in which the Gaussian parameters are expressed (as set forth above). For instance, the training operation can dispense with the use of quantization performed by previous solutions.

As stated above, the training operation takes place in the context of an implementation that makes use of shared spline parameters, and thus, which makes reference to regression classes $\bar{\omega}$. However, other implementations can omit the use of shared spline parameters.

Block 602 involves training a conventional HMM using any training technique.

Block 604 entails initializing the training operation by copying $$\mu_{i,l,d}^{(0)} \text{ and } \Sigma_{i,l,d}^{(0)}$$

from the conventional HMM, setting $\mu_{\bar{\omega}(i,l,d)}^{(1)}, \ldots, \mu_{\bar{\omega}(i,l,d)}^{(K)}$ to zero, and setting $\Sigma_{\varpi(i,l,d)}^{(1)}, \ldots, \Sigma_{\varpi(i,l,d)}^{(K)}$ to one.

Block 606 entails performing the discriminative training operation. In each discriminative training iteration, block 606 entails first re-estimating $\mu_{\varpi(i,l,d)}^{(1)}, \ldots, \mu_{\varpi(i,l,d)}^{(K)}$ then $\Sigma_{\varpi(i,l,d)}^{(1)}, \ldots, \Sigma_{\varpi(i,l,d)}^{(K)}$, and finally $\mu_{i,l,d}^{(0)}$ and $\Sigma_{i,l,d}^{(0)}$ with the rest of the parameters fixed. Illustrative equations to compute these parameters are described below. (In the following equations, the superscript ' refers to a current parameter set. The algorithm operates by iteratively estimating a new parameter set based on the current estimated parameter set.)

Block 608 entails storing the final parameters which define the VPHMMs.

Before presenting the training algorithm perform in block 606, the following expression is defined:

$$d(r, t, i, l) = \sum_s d'(s) p(q_{r,t} = i, l \mid s, \Lambda'). \quad (25)$$

Here, $\Lambda'$ is the current parameter set, $q_{r,t}$ is the state at time t in the r-th utterance, s is the label sequence, and d'(s) is a parameter that controls the convergence speed. The occupation probability of Gaussian mixture component l of state i, at time t in the r-th utterance can be denoted as:

$$\gamma_{i,l,r,s_r}(t) = p(q_{r,t} = i, l \mid X_r, s_r, \Lambda'), \quad (26)$$

which can be obtained through an efficient forward-backward algorithm. Further, the following expression is defined:

$$\Delta\gamma(i, l, r, t) = \sum_s p(s \mid X, \Lambda')(C(s) - O(\Lambda'))\gamma_{i,l,r,s_r}(t). \quad (27)$$

Here, $O(\Lambda')$ is the discriminative training criterion and $C(s)$ is the weighting factor. For conciseness in presenting the re-estimation formulas, where appropriate, the remainder of the this section simplifies the notation of $\zeta_{r,t,d}$ as $\zeta$, $\varpi(i,l,d)$ as $\varpi$, $x_{r,t,d}$ as x, $\mu_{i,l,d}$ as $\mu$, $\Sigma_{i,l,d}$ as $\Sigma$, $\Delta\gamma(i, l, r, t)$ as $\Delta\gamma$, and d(r, t, i, l) as d.

The follow illustrative formulas can be used in the re-estimation of $\mu_{i,l,d}^{(0)}$ and $\Sigma_{i,l,d}^{(0)}$:

$$\mu_{i,l,d}^{(0)} = \frac{Z1}{Z2} + \mu_{i,l,d}'^{(0)}. \quad (28)$$

-continued

Here, $Z1 = \sum_r \sum_t \Delta\gamma(x - \mu_\varpi'(\zeta))\Sigma^{-1}(\zeta)$, (29)

and $Z2 = \sum_r \sum_t (\Delta\gamma + d)\Sigma^{-1}(\zeta)$. (30)

Further, $$\Sigma_{i,l,d}^{(0)} = \Sigma_{i,l,d}'^{(0)} \frac{Z3}{Z4}. \quad (31)$$

Here, $Z3 = \sum_r \sum_t (\Delta\gamma(x - \mu(\zeta))^2 \Sigma'^{-1}(\zeta) + d)$, (32)

and $Z4 = \sum_r \sum_t \Delta\gamma + d$. (33)

The following illustrative formulas can be used in the re-estimation of $\tilde{\mu}_{\varpi(i,l,d)}$:

$$\tilde{\mu}_{\varpi(i,l,d)} = A_{\varpi(i,l,d)}^{-1} B_{\varpi(i,l,d)}. \quad (34)$$

In expression (34), $A_{\varpi(i,l,d)}$ is matrix whose element at the k-th row and the j-th column is:

$$A_{\varpi(i,l,d)}^{(k,j)} = \sum_r \sum_t \sum_{\substack{i',l',\text{st.} \\ \varpi(i',l',d)=\varpi(i,l,d)}} (\Delta\gamma + d)\Sigma^{-1}(\zeta)v_\varpi^{(k)}(\zeta)v_\varpi^{(j)}(\zeta). \quad (35)$$

$B_{\varpi(i,l,d)}$ is a vector whose k-th value is:

$$B_{\varpi(i,l,d)}^{(k)} = \sum_r \sum_t \sum_{\substack{i',l',\text{st.} \\ \varpi(i',l',d)=\varpi(i,l,d)}} \Delta\gamma\Sigma^{-1}(\zeta)(x - \mu_{i',l',d}^{(0)})v_\varpi^{(k)}(\zeta) + \\ \sum_r \sum_t \sum_{\substack{i',l',\text{st.} \\ \varpi(i',l',d)=\varpi(i,l,d)}} d\Sigma^{-1}(\zeta)(\mu'(\zeta) - \mu_{i',l',d}^{(0)})v_\varpi^{(k)}(\zeta) \quad (36)$$

The following illustrative formulas can be used in the re-estimation of $\tilde{\Sigma}_{\varpi(i,l,d)}$:

$$\tilde{\Sigma}_{\varpi(i,l,d)} = \tilde{\Sigma}'_{\varpi(i,l,d)} - (F_{\varpi(i,l,d)})^{-1} E_{\varpi(i,l,d)}. \quad (37)$$

Here, $F_{\varpi(i,l,d)}$ is a vector whose k-th row and j-th column is:

$$F_{\varpi(i,l,d)}^{(k,j)} = \quad (38)$$

$$\sum_r \sum_t \sum_{\substack{i',l',\text{st.} \\ \varpi(i',l',d)=\varpi(i,l,d)}} \left[ \begin{array}{c} \Delta\gamma(\Sigma_{i,l,d}^{(0)})^{-1}((x-\mu)(\zeta))^2 + \\ \Sigma'_\varpi(\zeta)) + 2d(\Sigma_{i,l,d}^{(0)})^{-1}\Sigma' \end{array} \right] s_\varpi^{(k)}(\zeta) s_\varpi^{(j)}(\zeta).$$

Further, $E_{\bar{\omega}(i,l,d)}$ is a vector whose k-th value is:

$$E_{\bar{\omega}(i,l,d)}^{(k)} = \sum_r \sum_t \sum_{\substack{i',l',\text{s.t.}\\ \bar{\omega}(i',l',d)=\bar{\omega}(i,l,d)}} \Delta\gamma(\Sigma_{i,l,d}^{(0)})^{-1/2} \quad (39)$$

$$\Sigma'^{-\frac{1}{2}}(\zeta)((x-\mu(\zeta))^2 - \Sigma'(\zeta))\varsigma_{\bar{\omega}}^{(k)}(\zeta).$$

F. Application of Clustering and Sharing

Each of the spline functions described above is characterized by spline parameters. That is, a set of spline parameters describes the shape of each spline function. This section describes one approach that can be used to cluster the spline functions into different classes, referred to as regression classes $\bar{\omega}$. In effect, the classes pertain to groups of spline functions that are similar to each other. Once the classes are formed, individual instances of the spline functions can make reference to their associated classes. This approach makes it possible for each individual spline functions to omit a "local copy" of the spline function's parameters; instead, the individual spline function can obtain the relevant spline parameters from a shared store of spline function parameters.

There are at least two advantages to the clustering approach. First, the use of a common store of shared spline parameters can reduce the complexity and storage requirements of the recognition system 100. More specifically, parameter sharing can be carried out so that the otherwise very large number of parameters in the VPHMMs can be effectively reduced with practically feasible amounts of training data. Second, each class of spline functions can provide a set of parameters that is potentially robust; this is because the class reflects a consensus among different spline functions which were used to define the class. Clustering cannot readily be performed on previous approaches that use global (non-piecewise) polynomial functions to approximate the Gaussian parameters because it is more difficult to find commonality among global polynomial functions. In other words, global polynomial functions are more unique and parameter-sensitive than individual spline segments; this is because a relatively small change in the parameters of a global polynomial function can affect the shape of the polynomial function in a relatively significant way.

As a point of clarification, the clustering described below pertains to the grouping of spline parameters. It is also possible to cluster the Gaussian-specific parameters. Known algorithms can be used to perform the clustering of Gaussian-specific parameters.

Figure 7:
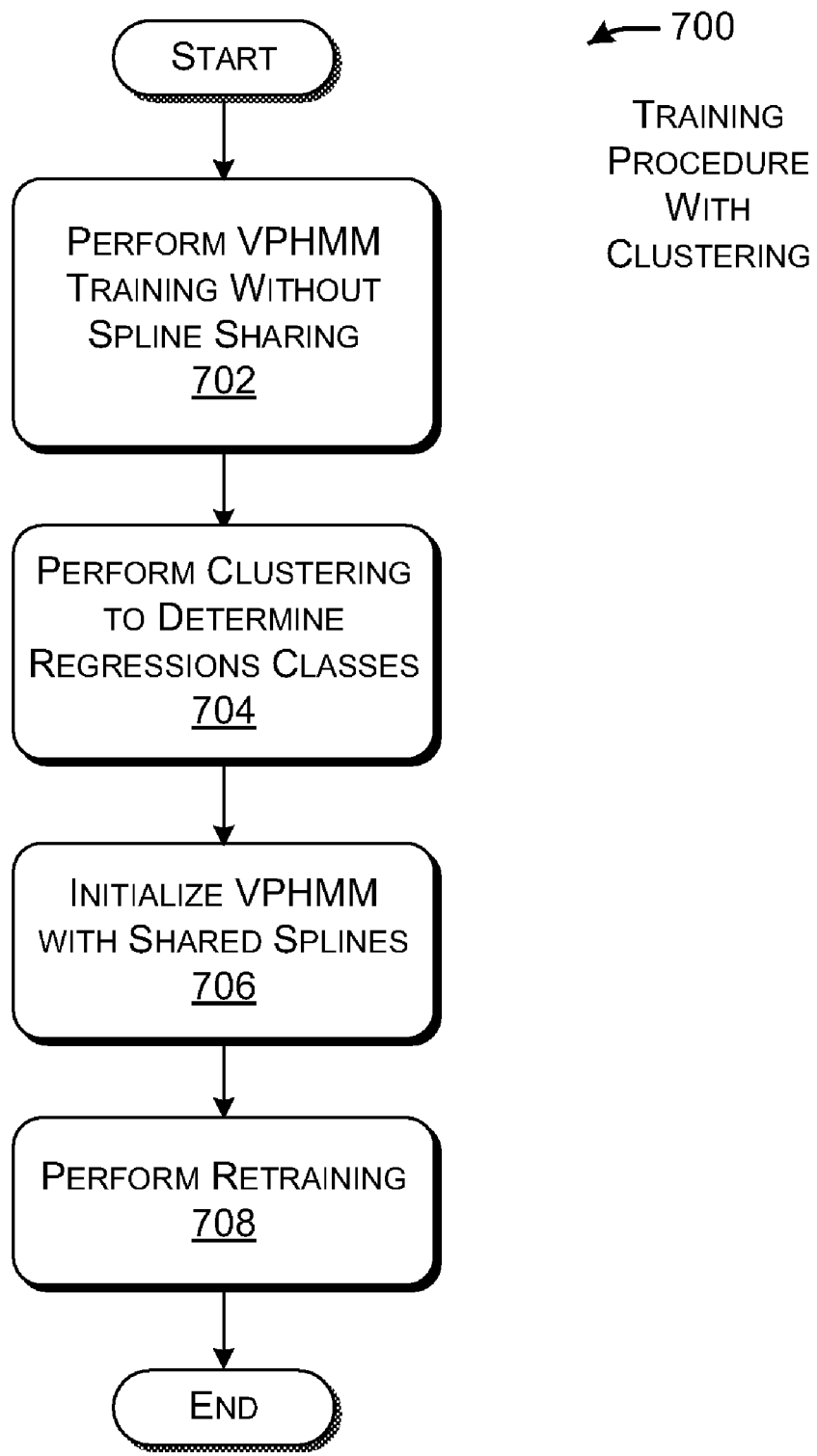
FIG. 7 is an illustrative procedure for performing clustering of parameters associated with piecewise functions.

FIG. 7 is a procedure 700 which presents an overview of the clustering operation. This procedure 700 can be implemented as part of the training operation performed by the recognition system 100.

In block 702, the recognition system 100 can perform training without the application of shared spline functions. This operation generates a plurality of individual spline functions which are used to approximate the way in which the Gaussian parameters change as a function of the environmental conditioning parameter.

In block 704, the recognition system 100 can perform clustering to organize the spline functions into classes. This approach involves defining distances between respective pairs of spline functions and then clustering the spline functions on the basis of the distances. That is, the clustering generally entails defining groups of clusters that have spline functions which are close together (as defined by the distances). One clustering algorithm that can be used to perform clustering is the k means clustering algorithm. This algorithm can generate N clusters (where N is a number of clusters defined by a user in advance). If one of the clusters that is formed is empty (meaning that it contains no spline functions), a non-empty cluster can be split into two to produce the selected number of N clusters.

Blocks 706 and 708 entail, respectively, initializing the VPHMMs with the classes defined by the clustering operation (in block 704) and then retraining the VPHMMs to derive a final set of VPHMM parameters.

The following discussion provides additional details regarding the computation of distances between pairs of spline functions according to one illustrative implementation.

To begin with, the distance between two functions $f_1$ and $f_2$ given the distribution of the domain $p(x)$ can be defined as:

$$d(f_1,f_2) = \int_x (f_1(x)-f_2(x))^2 p(x)dx. \quad (40)$$

This distance is also valid for two spline functions determined by evenly distributed knots:

$$\{y_1^{(i)}|i=1,\ldots,K\}, \text{ and} \quad (41)$$

$$\{y_2^{(i)}|i=1,\ldots,K\}. \quad (42)$$

Note that the calculation of the exact distance using equation (40) can be time-consuming. For this reason, the integration defined by equation (40) can be approximated with quantized summations:

$$d(f_1, f_2) = h\sum_{x=1}^{K}(y_1^{(i)} - y_2^{(i)})^2 p(x^{(i)}). \quad (43)$$

Figure 8:
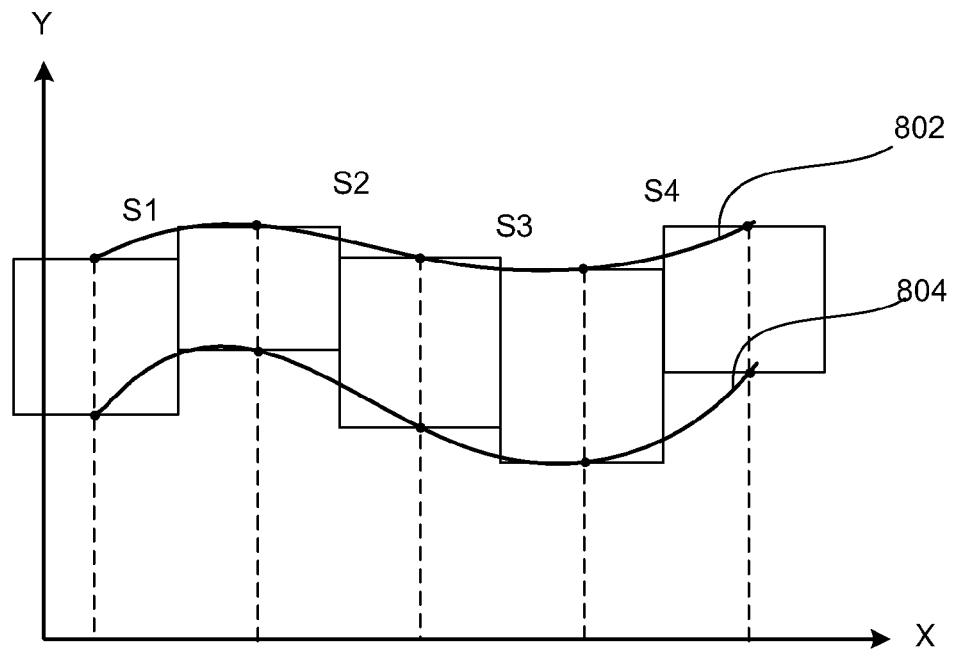
FIG. 8 is a graphical depiction of one illustrative technique for approximating a difference between two piecewise functions.

FIG. 8 graphically represents the calculation of the distance between two functions (802, 804) using the above approach. The quantized summations shown in this figure can be viewed as a histogram-based approximation of the difference between the two functions (802, 804).

Continuing with the derivation, it can be assumed that $p(x)=N(x;\mu,\sigma^2)$ follows a Gaussian distribution determined by the mean $\mu$ and the variance $\sigma^2$. As such, the above equation can be rewritten as:

$$d(f_1, f_2) = h\sum_{x=1}^{K}(y_1^{(i)} - y_2^{(i)})^2 \frac{1}{\sigma\sqrt{2\pi}}\exp\left(-\frac{(x^{(i)}-\mu)^2}{2\sigma^2}\right). \quad (44)$$

Note that parameters h, $\mu$, and $\sigma$ are the same for all the splines to be clustered, and:

$$h = \frac{2\alpha\sigma}{K-1}, \quad (45)$$

$$x^{(i)} = x^{(1)} + (i-1)h, \text{ and} \quad (46)$$

$$\mu = x^{(1)} + \frac{K-1}{2}h. \quad (47)$$

The distance calculation can thus be further simplified as:

$$d(f_1, f_2) \propto \sum_{x=1}^{K}(y_1^{(i)} - y_2^{(i)})^2 \exp\left(-\frac{(x^{(i)}-\mu)^2}{2\sigma^2}\right), \quad (48)$$

-continued $$= \sum_{x=1}^{K} (y_1^{(i)} - y_2^{(i)})^2 \exp\left(-\frac{h^2\left(i-1-\frac{K-1}{2}\right)^2}{2\sigma^2}\right),$$

$$= \sum_{x=1}^{K} (y_1^{(i)} - y_2^{(i)})^2 \exp\left(-\frac{2\alpha^2\left(i-\frac{K+1}{2}\right)^2}{(K-1)^2}\right).$$

The parameters associated with a class (or with an individual instance of a spline function if sharing is not used) can be represented in an economical form. More specifically, note that a K-knot cubic spline uses 2K parameters, that is, K parameters for $x^{(i)}$ and another K parameters for $y^{(i)}$. The number of parameters can be greatly reduced by using a spline function with evenly distributed $x^{(j)}$, as set forth in equation (10).

Based on these assumption, a spline function can be represented by storing only $y^{(i)}$ and $\{K, x^{(1)}, x^{(K)}\}$. Further note that only one $\{K, x^{(1)}, x^{(K)}\}$ is needed for each dimension of the conditioning parameter. Thus, the average number of parameters needed for each spline function is close to K.

Figure 9:
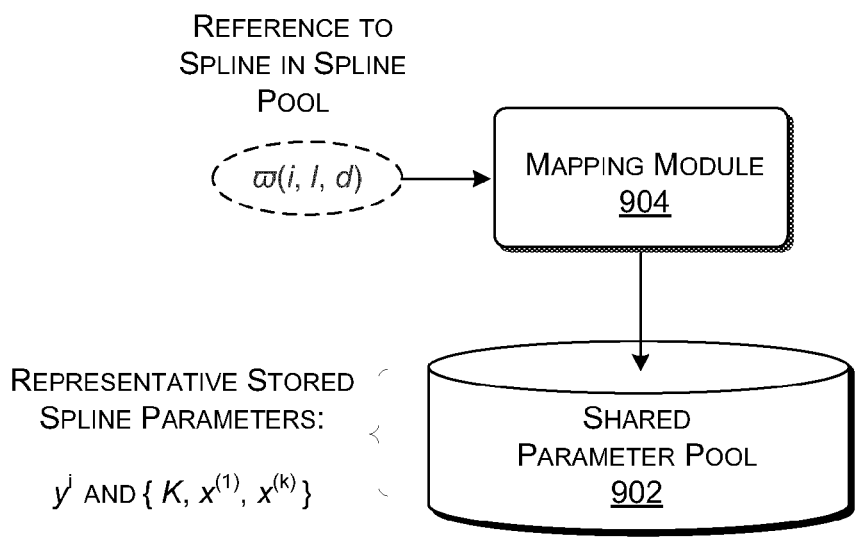
FIG. 9 shows illustrative functionality for mapping an instance of a piecewise function to an associated set of shared parameters.

FIG. 9 shows how the classes formed by clustering can be used to simplify the expression of spline functions. That figure shows a data store 902 that provide sets of parameters associated with respective classes. A mapping module 904 can receive reference information (e.g., $\bar{\omega}(i,l,d)$) which defines a class of spline functions. The mapping module 904 can map the reference information to the parameters associated with that class, as obtained from the data store 902. This aspect of the recognition system 100 omits the need for an instance of the spline function to maintain a local copy of the spline parameters which define the spline function.

G. Representative Processing Functionality

FIG. 10 sets forth illustrative electrical data processing functionality 1000 (simply "processing functionality" below) that can be used to implement any aspect of the functions described above. With reference to FIGS. 1 and 2, for instance, the type of processing functionality 1000 shown in FIG. 10 can be used to implement any aspect of the recognition system 100. In one case, the processing functionality 1000 may correspond to any type of computing device.

The processing functionality 1000 can include volatile and non-volatile memory, such as RAM 1002 and ROM 1004, as well as one or more processing devices 1006. The processing functionality 1000 also optionally includes various media devices 1008, such as a hard disk module, an optical disk module, and so forth. The processing functionality 1000 can perform various operations identified above when the processing device(s) 1006 executes instructions that are maintained by memory (e.g., RAM 1002, ROM 1004, or elsewhere). More generally, instructions and other information can be stored on any computer-readable medium 1010, including, but not limited to, static memory storage devices, magnetic storage devices, optical storage devices, and so on. The term "computer-readable medium also encompasses plural storage devices. The term computer-readable medium also encompasses signals transmitted from a first location to a second location, e.g., via wire, cable, wireless transmission, etc.

The processing functionality 1000 also includes an input/output module 1012 for receiving various inputs from a user (via input modules 1014), and for providing various outputs to the user (via output modules). One particular output mechanism may include a presentation module 1016 and an associated graphical user interface (GUI) 1018. The processing functionality 1000 can also include one or more network interfaces 1020 for exchanging data with other devices via one or more communication conduits 1022. One or more communication buses 1024 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A speech recognition system, comprising:
a processor operatively coupled to at least one memory to provide:
a feature determination module configured to extract features from a speech signal within an environment;
a condition determination module configured to determine at least one environmental conditioning parameter, wherein said at least one environmental conditioning parameter reflects a characteristic of the environment that affects a quality of speech recognition; and
a speech recognition module configured to use variable-parameter hidden Markov models (VPHMMs) to recognize speech based on the extracted features and said at least one environmental conditioning parameter,
each of the VPHMMs using a plurality of mixture components L in modeling state observations, and
a particular mixture component l of the plurality of mixture components L having at least one mixture component parameter that varies as a function of said at least one environmental conditioning parameter, as approximated by using a piecewise function that includes a plurality of connected segments.

2. The speech recognition system of claim 1, wherein said at least one environmental conditioning parameter is based on one or more of:
a signal-to-noise-ratio (SNR);
a power of noise in the environment;
a level of noise in the environment;
an accent of a speaker;
a specific style of speaking by the speaker; or
a rate of speech.

3. The speech recognition system of claim 1, wherein the condition determination module provides an instantaneous measure of said at least one environmental conditioning parameter for use in speech recognition.

4. The speech recognition system of claim 1, wherein said at least one environmental conditioning parameter is based on:

$$\zeta_d = \sum_i a_{d,i} \log \frac{\sigma_{i,y}^2}{\sigma_{i,n}^2} = \sum_i a_{d,i} (\log \sigma_{i,y}^2 - \log \sigma_{i,n}^2),$$

where $\zeta_d$ is said at least one environmental conditioning parameter having dimension d, $a_{d,i}$ is an inverse discrete cosine transformation (IDCT) coefficient, and $\sigma_{i,y}^2$ is a power of a noisy speech signal y from an i-th Mel-frequency filter, and $\sigma_{i,n}^2$ is a power of a noise component n of the noisy speech signal y from the i-th Mel-frequency filter.

5. The speech recognition system of claim 1, wherein the particular mixture component l uses a spline function for the piecewise function.

6. The speech recognition system of claim 5, wherein the spline function is a cubic spline function.

7. The speech recognition system of claim 5, wherein a distribution of said at least one environmental conditioning parameter for the particular mixture component l is modeled as a Gaussian distribution, and wherein a range of interpolation associated with the spline function is determined by identifying a desired part of the Gaussian distribution.

8. The speech recognition system of claim 1, wherein the particular mixture component l is a Gaussian mixture component, and wherein said of at least one mixture component parameter includes a mean parameter µ and a variance parameter Σ.

9. The speech recognition system of claim 8, wherein each of the mean parameter µ and the variance parameter Σ of the mixture component l is represented in a form in which a Gaussian-specific part is separated from a sharable part.

10. The speech recognition system of claim 8, wherein the mean parameter µ and the variance parameter Σ of the component l are functions of said at least one environmental conditioning parameter ζ, as represented by:

$$\mu_{i,l,d}(\zeta_{r,t,d}) = \mu_{i,l,d}^{(0)} + \xi(\zeta_{r,t,d} \mid \mu_{i,l,d}^{(1)}, \ldots, \mu_{i,l,d}^{(K)}), \text{ and}$$

$$\Sigma_{i,l,d}(\zeta_{r,t,d}) = \Sigma_{i,l,d}^{(0)} \xi^{-2}(\zeta_{r,t,d} \mid \Sigma_{i,l,d}^{(1)}, \ldots, \Sigma_{i,l,d}^{(K)}),$$

where i identifies a state, d identifies a dimension, r refers to utterance, t refers to frame, ξ refers to a spline function which serves as the piecewise function for the particular mixture component l, $\mu_{i,l,d}^{(0)}$ and $\Sigma_{i,l,d}^{(0)}$ are Gaussian-component-specific mean and variance parts of the particular mixture component l, and $\mu_{i,l,d}^{(1)}, \ldots, \mu_{i,l,d}^{(K)}$ and $\Sigma_{i,l,d}^{(1)}, \ldots, \Sigma_{i,l,d}^{(K)}$ are spline knots for the particular mixture component l that are shareable across different mixture components.

11. The speech recognition system of claim 10, wherein the mean parameter µ and the variance parameter Σ for the particular mixture component l can also be expressed as:

$$\mu_{i,l,d}(\zeta_{r,t,d}) = \mu_{i,l,d}^{(0)} + v_{i,l,d}^T(\zeta_{r,t,d})\tilde{\mu}_{i,l,d}, \text{ and}$$

$$\Sigma_{i,l,d}(\zeta_{r,t,d}) = \Sigma_{i,l,d}^{(0)}(\varsigma_{i,l,d}^T(\zeta_{r,t,d})\tilde{\Sigma}_{i,l,d})^{-2},$$

where, $\tilde{\mu}_{i,l,d}$ and $\tilde{\Sigma}_{i,l,d}$ are mean and variance-related vectors, respectively, and $v_{i,l,d}^T(\zeta_{r,t,d})$ and $\varsigma_{i,l,d}^T(\zeta_{r,t,d})$ are functions based on interpolation parameters.

12. The speech recognition system of claim 11, wherein:

$$\tilde{\mu}_{i,l,d} = [\mu_{i,l,d}^{(1)}, \ldots, \mu_{i,l,d}^{(K)}]^T,$$

$$v_{i,l,d}^T(\zeta_{r,t,d}) = E_{\zeta_{r,t,d}}^T + F_{\zeta_{r,t,d}}^T C^{-1} D,$$

$$\tilde{\Sigma}_{i,l,d} = [\Sigma_{i,l,d}^{(1)}, \ldots, \Sigma_{i,l,d}^{(K)}]^T, \text{ and}$$

$$\varsigma_{i,l,d}^T(\zeta_{r,t,d}) = E_{\zeta_{r,t,d}}^T + F_{\zeta_{r,t,d}}^T C^{-1} D,$$

where $E_{\zeta_{r,t,d}}$, $F_{\zeta_{r,t,d}}$, C, and D are functions based on interpolation parameters.

13. The speech recognition system of claim 11, wherein the VPHMMs are produced by discriminative training.

14. A method for training a recognition system that uses variable-parameter hidden Markov models (VPHMMs) for recognizing speech, comprising:
provided trained hidden Markov models;
converting the trained hidden Markov models, by a processor, into an initial form; and
retraining the initial form of the trained hidden Markov models to yield final parameters of the VPHMMs, the retraining using a discriminative approach without quantization to explicitly separate different speech classes,
each of the VPHMMs using a plurality of Gaussian mixture components to model state observations, each Gaussian mixture component having at least one mixture component parameter that varies as a function of at least one environmental conditioning parameter.

15. The method of claim 14, wherein said at least one environmental conditioning parameter is based on one or more of:
a signal-to-noise-ratio (SNR);
a power of noise in an environment;
a level of noise in the environment;
an accent of a speaker;
a specific style of speaking by the speaker; or
a rate of speech.

16. The method of claim 14, wherein said at least one environmental conditioning parameter is an instantaneous signal-to-noise-ratio (SNR) in a cepstral domain.

17. The method of claim 14, wherein said at least one mixture component parameter of each Gaussian mixture component is represented in a form in which a Gaussian-specific part is separated from a sharable part.

18. A computer-readable medium for storing computer-readable instructions, the computer-readable medium not consisting of a propagating signal, the computer-readable instructions providing a speech recognition system when executed by one or more processing devices, the computer-readable instructions comprising:
logic configured to use variable-parameter hidden Markov models (VPHMMs) to recognize speech, the VPHMMs using a plurality of Gaussian mixture components in modeling state observations, each Gaussian mixture component having a mean parameter µ and a variance parameter Σ that each vary as a function of at least one instantaneous environmental conditioning parameter, as approximated by a piecewise function that includes a plurality of connected segments.

19. The computer-readable medium of claim 18, wherein said at least one instantaneous environmental conditioning parameter is based on one or more of:
a signal-to-noise-ratio (SNR);
a power of noise in an environment;
a level of noise in the environment;
an accent of a speaker;
a specific style of speaking by the speaker; or
a rate of speech.

20. The computer-readable medium of claim 18, wherein said at least one instantaneous environmental conditioning parameter is an instantaneous signal-to-noise-ratio (SNR) in a cepstral domain.

* * * * *